United States Patent [19]
Ono et al.

[11] 3,742,039
[45] June 26, 1973

[54] PROCESS FOR PRODUCING 1,4-DIACETOXY-2-BUTENE FROM BUTADIENE

[75] Inventors: Isao Ono; Tadahisa Yanagihara; Toshikuni Koga; Takao Kato; Hiroaki Okada, all of Yamaguchi-ken, Japan

[73] Assignee: Toyo Soda Manufacturing Co., Ltd., Tokyo, Japan

[22] Filed: Sept. 29, 1970

[21] Appl. No.: 76,641

[30] Foreign Application Priority Data
Oct. 2, 1969 Japan.............................. 44/78176

[52] U.S. Cl............................................. 260/497 A
[51] Int. Cl....................... C07c 67/04, C07c 69/16
[58] Field of Search................................. 260/497 A

[56] References Cited
FOREIGN PATENTS OR APPLICATIONS
1,138,366  1/1969  Great Britain.................. 260/497 A Primary Examiner—Lorraine A. Weinberger
Assistant Examiner—Richard D. Kelly
Attorney—Oblon, Fisher and Spivak

[57] ABSTRACT

A process for producing 1,4-diacetoxy-2-butene from butadiene which comprises contacting a mixed gas containing 5 to 70 percent by volume butadiene in combination with oxygen, with a reaction medium of liquid acetic acid containing palladium acetate, cupric acetate, and at least one acetate component selected from the group consisting of heavy metal acetates, except palladium acetate and copper acetate, alkali metal acetate, alkaline-earth metal acetate, and mixtures thereof, wherein said reaction is conducted at a temperature in the range of 100°C. to 140°C.

9 Claims, No Drawings

PROCESS FOR PRODUCING 1,4-DIACETOXY-2-BUTENE FROM BUTADIENE

BACKGROUND OF THE INVENTION

1. Field Of The Invention

This invention relates to a process for selectively producing 1,4-diacetoxy-2-butene from butadiene.

2. Description Of Prior Art

The present inventors have previously found and reported in Japanese Patent Application No. 90,547/1968, that unsaturated diesters, such as diacetoxy-butene, can be produced by reacting a conjugated diolefin, carboxylic acid and oxygen in the presence of at least one palladium salt and one non-palladium metallic salt, of a metal having plural valence states, or in the additional presence of at least one alkali metal salt, or alkaline-earth metal salt.

British Patent No. 1,138,366, disclosed that unsaturated diesters, such as diacetoxy-butene, may be produced by a process which comprises contacting a conjugated diolefin with a carboxylic acid in a liquid phase, in the presence of a salt or coordination compound of palladium, platinum, nickel, iron or cobalt. In Example 2 of that reference, when butadiene was bubbled at a rate of 3 ½ liters per hour through a solution of palladium chloride (5.4 g, 0.15 mol/l), cupric acetate (18.2 g., 0.5 mol/l), and lithium acetate (6.6 g., 0.5 mol/l), in acetic acid (200 mls.) for six hours at 80°C., a mixture of 1,4-diacetoxy-2-butene and 3,4-diacetoxy-1-butene (in a ratio of 1 : 1), combined weight 1.13 gms. (equivalent to 6.57 m mol) was obtained. Further studies by the present inventors have shown, however, that when the process described in the British patent is used to prepare 1,4-diacetoxy-2-butene, a large quantity of byproduct is formed. This byproduct is believed to be a combination of 3,4-diacetoxy-1-butene and certain high boiling materials believed to be high carbon number unsaturated esters. The formation of these byproducts, tends to decrease the selectivity of the reaction for 1,4-diacetoxy-2-butene.

SUMMARY OF THE INVENTION

Accordingly, it is one object of the present invention to provide a technique for suppressing the formation of 3,4-diacetoxy-1-butene and for suppressing the formation of the high boiling materials, so that the selectivity of the reaction for 1,4-diacetoxy-2-butene, and the rate of formation of 1,4-diacetoxy-2-butene, will each be increased.

The present inventors have now found that there exists a close correlation between the concentration of butadiene dissolved in the reacting liquid (acetic acid containing a catalyst), and the amount of formation of byproduct of high boiling materials. Furthermore, a close correlation has been found to exist between the concentration of any halide in the reacting liquid, the quantity of 3,4-diacetoxy-1-butene byproduct, and the formation rate of 1,4-diacetoxy-2-butene. This has led to the discovery of the following three conditions which are essential for the production of 1,4-diacetoxy-2-butene at a high selectivity and at a high rate of formation:

1. The concentration of butadiene dissolved in the reacting liquid should be kept low by maintaining the reaction temperature at a comparatively high level, and by maintaining the concentration of butadiene in the blowing gas at a low level.
2. Palladium acetate should be used as the palladium salt; and,
3. an acetate salt should be used instead of a halide salt.

These considerations are satisfied by a process for producing 1,4-diacetoxy-2-butene from butadiene which comprises contacting a mixed gas containing 5 to 70 percent by volume butadiene and oxygen or oxygen in combination with an inert gas, with a liquid acetic acid containing palladium acetate, cupric acetate, and at least one additional acetate component selected from the group consisting of non-palladium and non-copper heavy metal acetates, alkali metal acetates, and alkaline-earth metal acetates. Good results are obtainable when the reaction is conducted within the temperature range of 100°C. to 140°C.

DETAILED DESCRIPTION OF PREFERRED EMBODIMENTS

According to the present invention, a gas mixture containing butadiene and oxygen is contacted with a liquid mixture containing acetic acid and certain metallic acetates. The mixed gas may contain 5 to 70 percent by volume butadiene, and the remainder may contain oxygen or oxygen diluted with nitrogen and/or other inert gases. If desired, air can be used as the source of oxygen gas.

The liquid mixture contains acetic acid, palladium acetate, cupric acetate, and at least one additional acetate selected from the group consisting of heavy metal acetates other than palladium acetate or copper acetate, alkali metal acetate, alkaline-earth metal acetate, or combinations thereof.

The temperature of the raction should be within the range of 100°C. to 140°C., and the pressure should be at least atmospheric pressure or higher.

Under the reaction conditions described above, and by specially selecting the catalyst, the following advantageous effects can be attained:

1. By keeping butadiene in the gaseous mixture at a level of between 5 to 70 volume per cent, and by maintaining the reaction temperature within the range of 100°C. to 140°C., the concentration of butadiene dissolved in the reacting liquid may be controlled at a suitably low level. Consequently, the production of 1,4-diacetoxy-2-butene can be carried out at a high rate of formation without substantial byproduct production of high boiling materials.
2. By using palladium acetate as the main palladium catalyst salt, it is possible to produce 1,4-diacetoxy-2-butene at a high rate of formation without the significant formation of byproduct 3,4-diacetoxy-1-butene. If any other form of palladium salt, such as palladium chloride, is used, a large quantity of byproduct 3,4-diacetoxy-1-butene is produced and consequently, the rate of formation of 1,4-diacetoxy-2-butene drops noticeably.
3. By using an acetate for the redox system and for the additive, the formation of byproduct 3,4-diacetoxy-1-butene is prevented, while the production of 1,4-diacetoxy-2-butene is formed at a very high rate. If other metallic salts, such, for example, as chlorides, are used, 3,4-diacetoxy-1-butene will be produced in relatively large quantities and the formation of 1,4-diacetoxy-2-butene will be suppressed.

Whereas 1,4-diacetoxy-2-butene can be converted into tetrahydrofuran by hydrolysis, hydrogenation, and cyclization, 3,4-diacetoxy-1-butene can only be converted into tetrahydrofuran by first subjecting it to isomerization to reconvert it to 1,4-diacetoxy-2-butene. 1,4-diacetoxy-2-butene, therefore, is a more economically and industrially advantageous material than the isomer 3,4-diacetoxy-1-butene.

The reaction of the present invention, is unique in its capability of forming 1,4-diacetoxy-2-butene at a high rate of formation and at a high degree of selectivity, while preventing the byproduction of 3,4-diacetoxy-1-butene. In fact, it is possible to produce 1,4-diacetoxy-2-butene at a rate which is at least 10 times faster, yet at a significantly higher selectivity, than that provided by the Examples described in British Patent No. 1,138,366.

The desirable mole concentration of palladium acetate used in the present invention is from 0.001 to 0.05 mol/l. The redox system, i.e., cupric acetate, used in this process, should be present at a mole concentration in the range of 0.05 to 2.0 mol/l. Suitable additives, or heavy metal acetates, used in this process, include manganese acetate, iron acetate, cobalt acetate, nickel acetate, chromium acetate, lead acetate, and barium acetate and the like. Since palladium acetate and copper acetate are necessary components of the system, they cannot be used to satisfy the requirement for the presence of a heavy metal acetate. Other additive acetates may also be used, either in addition to the heavy metal acetate or instead of the heavy metal acetate. For example, suitable acetates within the context of the present invention are the alkali metal acetates or the alkaline-earth metal acetates. The additives can be present at a mole concentration of between 0.1 to 2.0 mol/l.

If desired, the metallic acetates can be added to the reaction in the form of the metal itself, or in the form of a metal oxide or hydroxide, which can form an acetate in the reaction system with the acetic acid. Of course, the metallic acetates can be directly added to the system, if so desired.

The preferable reaction temperature range is from 100°C. to 140°C. When the temperature is below 100°C., both the rate of formation of 1,4-diacetoxy-2-butene and the selectivity of the reaction for 1,4-diacetoxy-2-butene will drop markedly. Conversely, when the temperature is above 140°C., the formation of high boiling materials will increase substantially as compared with the preferred range, and hence the higher temperatures are not considered to be as desirable.

Having now generally described the invention, a further understanding can be attained by reference to certain specific Examples which are provided herein for purposes of illustration only and are not intended to be limiting in any manner.

EXAMPLE 1

Glacial acetic acid (200 mls.), palladium acetate (0.45 gms., 0.01 mol/l), cupric acetate (8.0 gms. 0.2 mol/l), and potassium acetate (9.8 gms., 0.5 mol/l) were placed in a reactor equipped with a thermometer, a condenser, a gas blowing pipe and stirring equipment, while keeping the temperature of the contents at 100°C. in an oil bath. A mixed gas containing 45 percent (vol.) butadiene and 55 percent (vol.) oxygen was bubbled at the rate of 5 liters per hour, to carry out the reaction. When the process was performed in this manner, 1,4-diacetoxy-2-butene was produced at the rate of 10.3 m mol/hr. The selectivity of 1,4-diacetoxy-2-butene to the reacted butadiene was found to be 80 percent. The quanity of 3,4-diacetoxy-1-butene formed was extremely little.

EXAMPLE 2

Glacial acetic acid (400 ml.), palladium acetate (0.005 mol/l), potassium acetate (0.5 mol/l), and cupric acetate (0.2 mol/l) were placed in a reactor as described in Example 1. The reaction temperature was 120°C., and the reaction was conducted in a similar manner to Example 1. The formation rate of 1,4-diacetoxy-2-butene was 9.1 m mol/hr., and the selectivity was found to be 77 percent to the reacted butadiene. The quantity of 3,4-diacetoxy-1-butene formed was extremely little.

EXAMPLE 3

Potassium acetate in Example 1 was replaced with magnesium acetate (0.5 mol/l) and the reaction was conducted in a similar manner as in Example 1. The formation rate of 1,4-diacetoxy-2-butene was 7.8 m mol/hr., and the selectivity to the reacted butadiene was 83%. The quantity of 3,4-diacetoxy-1-butene was extremely little.

EXAMPLE 4

Potassium acetate in Example 1 was replaced with manganese acetate (0.5 mol/l) and the reaction was conducted in a similar manner as in Example 1. The formation rate of 1,4-diacetoxy-2-butene was 5.5 m mol/hr. and the selectivity to the reacted butadiene was 85 percent. The quantity of 3,4-diacetoxy-1-butene formed was again extremely little.

EXAMPLE 5

The reaction of Example 1 was repeated except that the reaction temperature was changed to 110°C., and components of the mixed gas were butadiene 25 percent, oxygen 50 percent, and nitrogen 25 percent. The formation rate of 1,4-diacetoxy-2-butene was 6.3 m mol/hr., and the selectivity to the reacted butadiene was found to be 89 percent. The quantity of 3,4-diacetoxy-1-butene was extremely little.

EXAMPLE 6

Potassium acetate (0.5 mol/l) was replaced with nickel acetate (0.5 mol/l) and lithium acetate (0.5 mol/l), and the reaction was conducted in a similar manner as in Example 1. The formation rate of 1,4-diacetoxy-2-butene was 8.6 m mol/hr. and the selectivity to the reacted butadiene was found to be 76 percent. The quantity of 3,4-diacetoxy-1-butene was extremely little.

EXAMPLE 7

The reaction of Example 1 was repeated except that 100 ml of glacial acetic acid was used. The concentration of palladium acetate was 0.001 mol/l, the concentration of cupric acetate was 0.05 mol/l, and the concentration of potassium acetate was 0.05 mol/l. The components of the mixed gas were 5 percent butadiene and 95 percent air, and was bubbled at 20 l/hr., a similar manner as in Example 1. In this case the formation rate of 1,4-diacetoxy-2-butene was 0.9 m mol/hr. and the selectivity to reacted butadiene was 92 percent. The quantity of 3,4-diacetoxy-1-butene formed was extremely little.

EXAMPLE 8

The reaction of Example 1 was repeated, except that the concentration of palladium acetate was changed to 0.05 mol/l and the concentration of cupric acetate was changed to 2.0 mol/l. The components of the mixed gas were changed to 78% butadiene and 30% oxygen, which was bubbled at 20 l/hr. The formation rate of 1,4-diacetoxy-2-butene was 40.6 m mol/hr. and the selectivity to reacted butadiene was 61 percent. The quantity of 3,4-diacetoxy-1-butene formed was extremely little.

EXAMPLE 9

The reaction of Example 1 was repeated, except that lithium acetate was used instead of potassium acetate. The formation rate of 1,4-diacetoxy-2-butene was 9.8 m mol/hr. and the selectivity to reacted butadiene was 78 percent. The quantity of 3,4-diacetoxy-1-butene formed was extremely little.

EXAMPLE 10

The reaction of Example 1 was repeated, except that barium acetate was used instead of potassium acetate. The concentration of barium acetate was 0.5 mol/l. The formation rate of 1,4-diacetoxy-2-butene was 6.2 m mol/hr. and the selectivity to reacted butadiene was 71 percent. The quantity of 3,4-diacetoxy-1-butene formed was extremely little.

EXAMPLE 11

The reaction of Example 1 was repeated, except that cobalt acetate (III) was used instead of potassium acetate. The concentration of cobalt acetate (III) was 10.5 mol/l. The formation rate of 1,4-diacetoxy-2-butene was 4.0 m mol/hr and the selectivity to reacted butadiene was 81 percent. The quantity of 3,4-diacetoxy-1-butene formed was extremely little.

EXAMPLE 12

100 ml of acetic acid, 0.255 g. (0.01 mol/l) of palladium acetate, 4.0 g (0.2 mol/l) of copper acetate, 4.9 g (0.5 mol/l) of potassium acetate and 2 g of butadiene were placed in the autoclave of 200 ml inner capacity with electromagnetic stirring, and sealed. An oxygen-nitrogen (1 : 1) mixed gas was fed into the autoclave at 20 atmosphere. After heating to 135°C., the reaction was carried out for about one hour while stirring. Oxygen was supplied with the pressure accumulator and the secondary pressure regulator.

3.1 g of 1,4-diacetoxy-2-butene was produced and the selectivity to reacted butadiene was 63 percent.

COMPARISON EXAMPLE 1

The reaction of Example 1 was repeated, except that palladium chloride was used instead of palladium acetate (0.01 mol/l). Lithium acetate was also present in a concentration of 0.5 mol/l. In this case the quantity of 1,4-diacetoxy-2-butene formed was very little.

COMPARISON EXAMPLE 2

The reaction of Example 1 was repeated, except that the mixed gas contained 75 percent butadiene and 25 percent oxygen. In this case, the formation rate of 1,4-diacetoxy-2-butene was 9.3 m mol/hr., and the selectivity to the reacted butadiene was found to drop below 45 percent.

COMPARISON EXAMPLE 3

The reaction of Example 1 was repeated, except that the reaction temperature was changed to 80°C. In this case, the formation rate of 1,4-diacetoxy-2-butene was 3.6 m mol./hr., and the selectivity to the reacted butadiene was found to drop down below 58 percent.

COMPARISION EXAMPLE 4

The reaction of Example 1 was repeated, except that 0.01 mol/l of lithium chloride was further added to the catalyst system. In this case, the formation rate of 1,4-diacetoxy-2-butene was 3.4 m mol/hr., and the selectivity to the reacted butadiene was found to be 48 percent.

In each of the above Examples, the composition of the gas mixtures are by volume unless otherwise indicated.

Having now fully described the invention, it will be apparent to one of ordinary skill in the art that many changes and modifications can be made thereto without departing from the spirit or scope of the invention. Accordingly,

What is claimed and intended to be covered by Letters Patent of the United States is:

1. A process for producing 1,4-diacetoxy-2-butene from butadiene which comprises contacting a mixed gas containing 5 to 70 percent by volume butadiene in combination with oxygen, with a reaction medium consisting essentially of liquid acetic acid . palladium acetate, cupric acetate, and at least one acetate component selected from the group consisting of manganese acetate, iron acetate, cobalt acetate, nickel acetate, chromium acetate, lead acetate, alkali metal acetate, alkaline-earth metal acetate, and mixtures thereof, wherein said reaction is conducted at a temperature in the range of 100°C. to 140°C.

2. The process of claim 1, wherein said mixed gas contains butadiene, oxygen, and an inert gas.

3. The process of claim 1, wherein said acetate is selected from the group consisting of manganese acetate, nickel acetate, cobalt acetate, iron acetate, lead acetate, and chromium acetate.

4. The process of claim 1, wherein said acetate is an alkali metal acetate selected from the group consisting of lithium acetate, sodium acetate, and potassium acetate.

5. The process of claim 1, wherein said acetate is an alkaline-earth metal acetate selected from the group consisting of beryllium acetate, magnesium acetate, calcium acetate, and barium acetate.

6. The process of claim 1, wherein the concentration of palladium acetate is 0.001 to 0.05 mol/l.

7. The process of claim 1, wherein the concentration of cupric acetate is from 0.05 to 2.0 mol/l.

8. The process of claim 1, wherein said reaction is conducted under normal pressure.

9. The process of claim 1, wherein at least one of said acetates are added to the reaction mixture in the form of an oxide or a hydroxide.

* * * * *